United States Patent [19]
Smart

[11] Patent Number: 5,452,055
[45] Date of Patent: Sep. 19, 1995

[54] APPARATUS AND METHOD FOR MAKING A REFERENCE EXPOSURE ON A LEADING AND/OR TRAILING PORTION OF A FILMSTRIP

[75] Inventor: David C. Smart, Rochester, N.Y.

[73] Assignee: Eastman Kodak Company, Rochester, N.Y.

[21] Appl. No.: 275,219

[22] Filed: Jul. 14, 1994

[51] Int. Cl.⁶ .............................................. G03B 27/52
[52] U.S. Cl. ......................................... 355/68; 355/40; 355/75
[58] Field of Search .................... 355/40, 41, 68, 75

[56] References Cited

U.S. PATENT DOCUMENTS

| | | | |
|---|---|---|---|
| Re. 34,362 | 8/1993 | Klosterhuber et al. | 355/40 |
| 4,260,245 | 4/1981 | Hujer | 355/40 |
| 4,295,713 | 10/1981 | Edwards | 352/235 |
| 4,555,632 | 11/1985 | Vockenhuber | 250/560 |
| 4,691,112 | 9/1987 | Wydler | 250/570 |
| 4,821,061 | 4/1989 | Gudmundson et al. | 355/40 |
| 4,933,711 | 6/1990 | Gudmundson et al. | 355/40 |
| 4,972,214 | 11/1990 | Shibayama et al. | 364/173.1 |
| 5,124,742 | 6/1992 | Yoshikawa | 355/27 |
| 5,128,519 | 7/1992 | Tokuda | 355/41 |
| 5,179,266 | 1/1993 | Imamura | 235/375 |
| 5,260,740 | 11/1993 | Seto | 355/41 |

*Primary Examiner*—Michael L. Gellner
*Assistant Examiner*—D. P. Malley
*Attorney, Agent, or Firm*—Roger A. Fields

[57] ABSTRACT

To locate a reference exposure on a non-perforated leading and/or trailing portion of a filmstrip in conformity with scene exposures associated with respective exposure locating perforations in the filmstrip, a pair of perforation sensors are spaced apart a distance which is the same as the pitch of the exposure locating perforations. When one of the two sensors detects an exposure locating perforation and the other does not, the leading or trailing portion is determined.

4 Claims, 2 Drawing Sheets

APPARATUS AND METHOD FOR MAKING A REFERENCE EXPOSURE ON A LEADING AND/OR TRAILING PORTION OF A FILMSTRIP

FIELD OF THE INVENTION

The invention relates generally to the field of photography, and in particular to an apparatus and a method for making a reference (or test) exposure on a leading and/or trailing portion of a filmstrip. More specifically, the reference exposure is to be located in conformity with scene exposures made on the filmstrip when the photographer takes pictures with a camera.

BACKGROUND OF THE INVENTION

It is known to provide one or more reference exposures on a filmstrip, in addition to the scene exposures, for a variety of uses. For example, the reference exposure might be a gray scale consisting of a series of gray tones extending in regular steps of increasing depth of tone from white (or clear) to black (or opaque). Typically, the gray scale is used during photofinishing as a test object for adjusting exposure and development to give true color balance in making three color separation negatives.

Prior art U.S. Pat. No. 4,260,245, issued Apr. 7, 1981, discloses apparatus for making reference exposures on marginal portions of a filmstrip between successive pairs of metering perforations in the filmstrip. While the metering perforations act as key points to critically locate the reference exposures relative to the scene exposures made on the filmstrip, the marginal portions are relatively small and therefore severely restrict the size of the reference exposures. Preferably, the reference exposures should be the same size as the scene exposures.

A conventional 35 mm filmstrip has its metering perforations continue along the entire length of the filmstrip, including the leading and trailing portions of the filmstrip. When a photofinisher wishes to make a reference exposure such as a gray scale on the leading and/or trailing portion of the filmstrip, the photofinisher does not know the exact locations that the scene exposures begin and end on the filmstrip. Consequently, the metering perforations cannot serve as key points to critically locate the reference exposure on the leading and/or trailing portion in conformity with the scene exposures. If the reference exposure is not located in conformity with the scene exposures, control during the printing process is difficult.

SUMMARY OF THE INVENTION

According to one aspect of the invention, there is provided a method of making a reference exposure on a filmstrip. The method comprises the steps of:

selecting a filmstrip that has a series of evenly spaced exposure locating perforations with a pitch slightly greater than the width of the reference exposure and has a leading and/or trailing non-perforated portion preceding or following the exposure locating perforations;

determining, using a pair of perforation sensors spaced apart a distance which is the same as the pitch of the series of exposure locating perforations, that one of the sensors has detected one of the exposure locating perforations and the other has not to identify the leading or trailing non-perforated portion of the filmstrip; and making the reference exposure on the leading or trailing portion of the filmstrip when one of the sensors has detected one of the exposure locating perforations and the other has not, whereby the reference exposure can be located in conformity with scene exposures made on the filmstrip substantially between successive pairs of the exposure locating perforations.

According to another aspect of the invention, there is provided an apparatus for making a reference exposure on a leading non-perforated portion of a filmstrip that precedes a series of evenly spaced perforations in the filmstrip having a pitch slightly greater than the width of the reference exposure and/or making the reference exposure on a trailing non-perforated portion of the filmstrip following the perforations. The apparatus comprises:

a pair of sensors spaced apart a distance which is the same as the pitch of the series of perforations to be able to simultaneously detect successive pairs of the perforations;

means for determining that one of the sensors has detected one of the perforations and the other has not to identify the leading or trailing non-perforated portion of the filmstrip; and means for making the reference exposure on the leading or trailing portion of the filmstrip when the means determines that one of the sensors has detected one of the perforations and the other has not, whereby the reference exposure can be located in conformity with scene exposures made on the filmstrip substantially between successive pairs of the perforations.

DETAILED DESCRIPTION OF THE INVENTION

Figure 1:
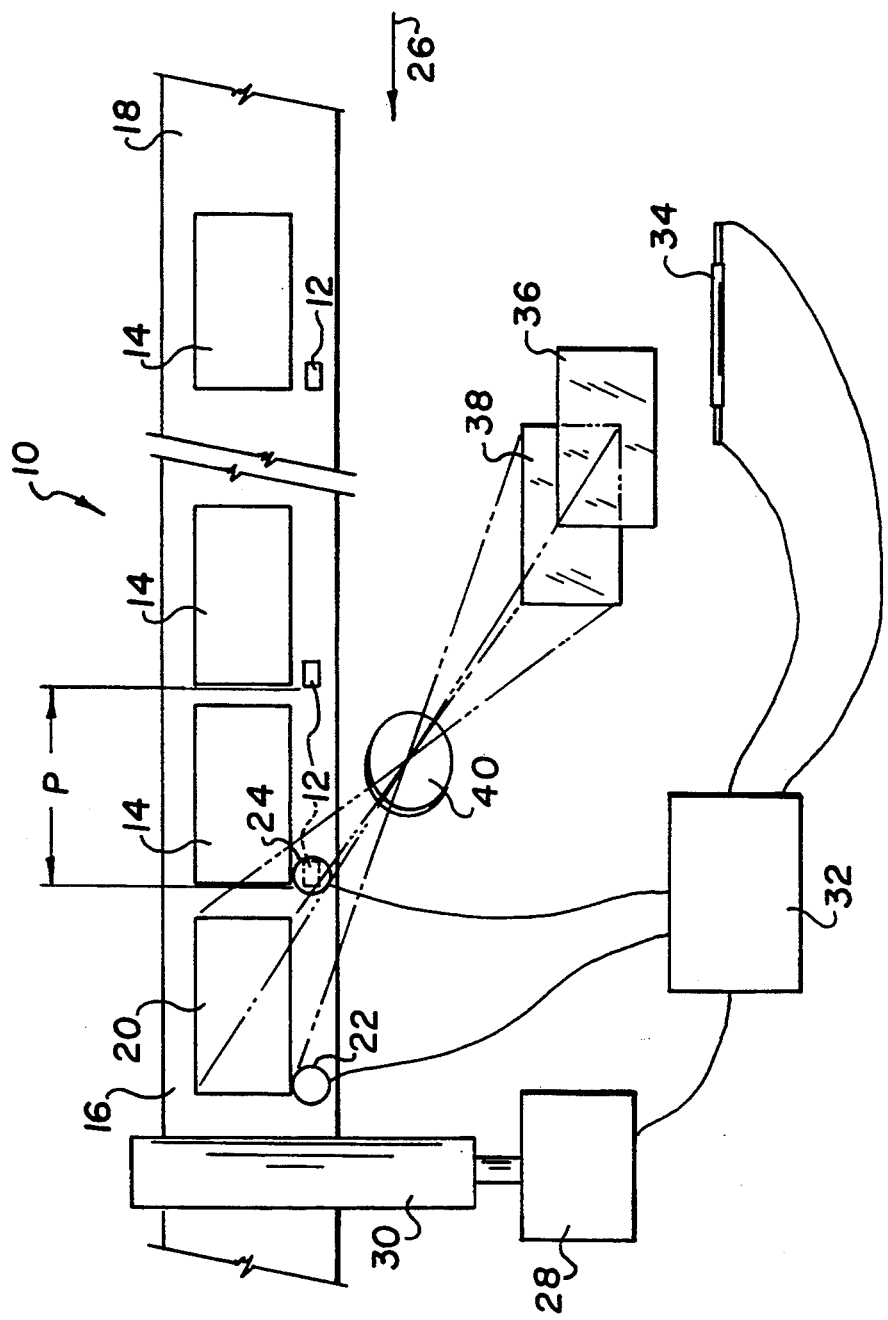
FIG. 1 is a schematic view of apparatus for making a reference exposure on a leading portion of a filmstrip.

Looking at FIG. 1, there is shown a 35 mm filmstrip 10 that has a series of evenly spaced identical metering (exposure locating) perforations 12 with a pitch P that is slightly greater than the width (36 mm) of conventional 24×36 mm scene exposures 14 made on the filmstrip when the photographer takes pictures with a camera. Each one of the metering perforations 12 is associated with a single one of the scene exposures 14, and they act as key points to critically locate the scene exposures during picture-taking in the camera. Thus, the camera can only make as many scene exposures 14 as there are metering perforations 12, and each one of the scene exposures will be located in an exact position on the filmstrip 10.

As shown in FIG. 1, the filmstrip 10 has a pair of unexposed leading and trailing non-perforated portions 16 and 18 which precede and follow the scene exposures 14 and the associated perforations 12. An object of the invention is to make a 24×36 mm reference(or test) exposure 20 on the leading and/or trailing portion 16 or 18 in conformity with (the pitch of) the scene exposures 14.

To accomplish the object, apparatus is shown in FIG. 1 which includes a pair of known perforation sensors 22 and 24, such as infrared emitters and detectors, that are spaced apart a distance which is the same as the pitch P of the series of metering perforations 12 to be able to simultaneously detect successive pairs of the metering perforations as the filmstrip 10 is advanced in a forward direction indicated by the arrow 26. A known drive motor 28 and pair of film advance rollers (only one shown) 30 serve to move the filmstrip 10 in the forward direction 26.

Figure 2:
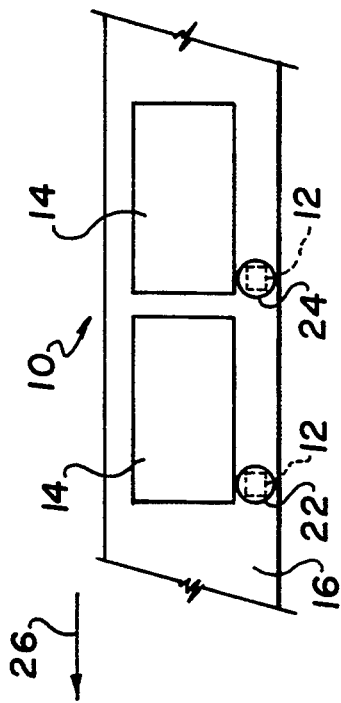
FIGS. 2–5 are schematic views depicting operational stages of the apparatus.
Figure 3:
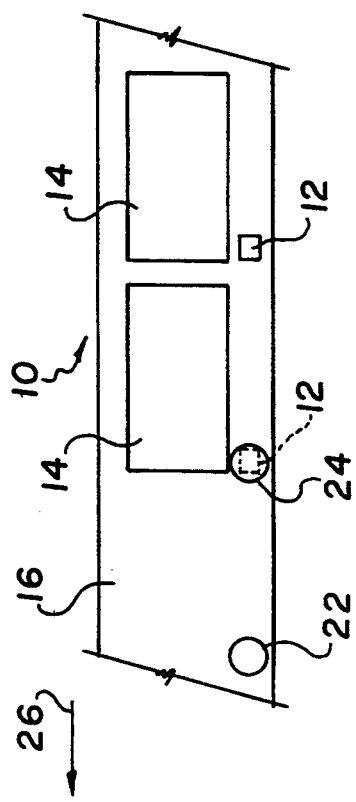
Figure 4:
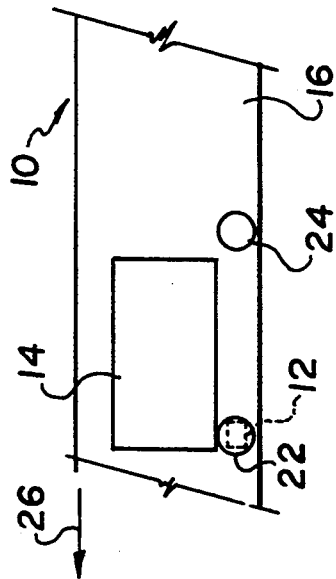
Figure 5:
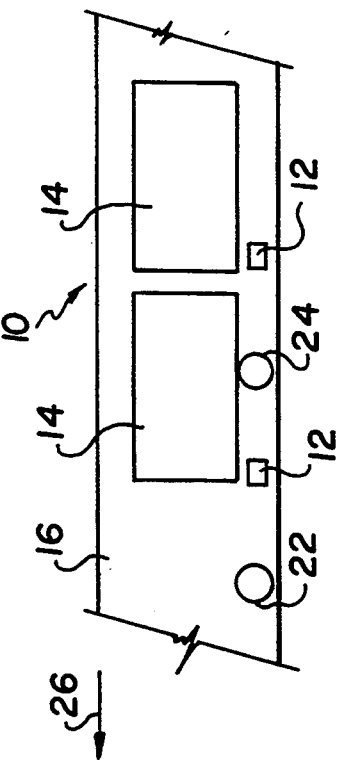

As shown in FIGS. 2–5, there are four combination-sensing states that the two sensors 22 and 24 can assume. One, the other, both, or neither of the sensors 22 and 24 will detect individual metering perforations 12 at any given time. In FIG. 2, the sensor 24 detects one of the metering perforations 12 and the sensor 22 does not. In binary terms, this can be expressed as "0, 1". In FIG. 3, both of the sensors 22 and 24 detect respective metering perforations 12. In binary terms, this can be expressed as "1, 1". In FIG. 4, neither of the sensors 22 and 24 detect individual metering perforations 12. In binary terms, this can be expressed as "0, 0". In FIG. 5, the sensor 22 detects one of the metering perforations 12 and the sensor 24 does not. In binary terms, this can be expressed as "1, 0". While the sensing states of the sensors 22 and 24 in FIGS. 3 and 4 are repeated, the sensing states of the sensors in FIGS. 2 and 5 occur only once, i.e. at the leading and trailing portions 16 and 18 of the filmstrip 10.

As shown in FIG. 1, a known microcomputer 32 is connected to the two sensors 22 and 24 and to a known light source 34 to ignite the light source only when the sensor 24 detects one of the metering perforations 12 and the sensor 22 does not (as in FIG. 2), i.e. the binary expression "0, 1". Light emitted from the light source 34 passes through a diffusing glass 36, a reference negative 38, and a fixed focus lens 40 to make the reference exposure 20 on the leading portion 16 in conformity with (the pitch of) the scene exposures 14. The microcomputer 32 does not ignite the light source 34 when both of the sensors 22 and 24 detect respective metering perforations 12 (as in FIG. 3), i.e. the binary expression "1, 1", when neither of the sensors 22 and 24 detect individual metering perforations 12 (as in FIG. 4), i.e. the binary expression "0, 0", and when the sensor 22 detects one of the metering perforations 12 and the sensor 24 does not, i.e. the binary expression "1, 0".

Alternatively, the microcomputer 32 can ignite the light source 34 only when the sensor 22 detects one of the metering perforations 12 and the sensor 24 does not (as in FIG. 5), i.e. the binary expression "1, 0". This would be to make the reference exposure 20 on the trailing portion 18 in conformity with (the pitch of) the scene exposures 14.

In another example, the microcomputer 32 can ignite the light source 34 when the sensor 24 detects one of the metering perforations 12 and the sensor 22 does not (as in FIG. 2), i.e. the binary expression "0, 1", and when the sensor 22 detects one of the metering perforations 12 and the sensor 24 does not (as in FIG. 5), i.e. the binary expression "1, 0". This would be to make the reference exposure 20 on the leading and trailing portions 16 and 18 in conformity with (the pitch of) the scene exposures 14. In this instance, the lens 40 would have to be adjusted with respect to the two sensors 22 and 24 for the two modes or an additional perforation would have to be added following the last one of the scene exposures 14.

In another example, the filmstrip 10 could have a series of two perforations for each of the scene exposures 14, preferably a leading perforation located approximately at the beginning of a scene exposure and a trailing perforation located approximately at the end of the scene exposure. The respective pairs of leading and trailing perforations would be evenly spaced along the filmstrip. Of course, the leading and trailing portions 16 and 18 of the filmstrip would not have any of these perforations. Also, there would be three sensors, i.e. an initial sensor, an intermediate sensor, and a final sensor. The intermediate and final sensors would be spaced apart a distance which is the same as the distance between the two perforations at each of the scene exposures, and the initial and intermediate sensors would be spaced apart a distance which is the same as the pitch between the leading perforations of the respective pairs of perforations. Consequently, there are six combination-sensing states that the three sensors can assume and are illustrated as follows:

| Initial Sensor | Intermediate Sensor | Final Sensor |
| --- | --- | --- |
| 0 | 1 | 1 |
| 0 | 1 | 0 |
| 0 | 0 | 0 |
| 0 | 0 | 1 |
| 1 | 1 | 1 |
| 1 | 1 | 0 |

The microcomputer 32 would ignite the light source 34 only when the intermediate and final sensors detect the leading and trailing perforations for a scene exposure and the initial sensor does not detect any of these perforations, i.e. the binary expression "0, 1, 1". This would occur only once (as in FIG. 2), and would be to make the reference exposure 20 on the leading portion 16 in conformity with (the pitch of) the scene exposures 14.

The invention has been described with reference to a preferred embodiment. However, it will be appreciated that variations and modifications can be effected by a person of ordinary skill in the art without departing from the scope of the invention.

PARTS LIST 10. filmstrip
12. metering perforations
14. scene exposures
16. leading portion
18. trailing portion
20. reference exposure
22. perforation sensor
24. perforation sensor
26. forward direction
28. drive motor
30. film advance rollers
32. microcomputer
34. light source
36. diffusing glass
38. reference negative
40. lens

I claim:

1. Apparatus for making a reference exposure on a leading non-perforated portion of a filmstrip that precedes a series of evenly spaced perforations in the filmstrip having a pitch slightly greater than the width of the reference exposure and/or making the reference exposure on a trailing non-perforated portion of the filmstrip following the perforations, said apparatus comprising:

a pair of sensors spaced apart a distance which is the same as the pitch of the series of perforations to be able to simultaneously detect successive pairs of the perforations;

means for determining that one of said sensors has detected one of the perforations and the other has not to identify the leading or trailing non-perforated portion of the filmstrip; and means for making the reference exposure on the leading or trailing portion of the filmstrip when said means determines that one of said sensors has detected one of the perforations and the other has not, whereby the reference exposure can be located in conformity with respective exposures made on the filmstrip substantially between successive pairs of the perforations.

2. A method of making a reference exposure on a filmstrip, comprising the steps of:

selecting a filmstrip that has a series of evenly spaced exposure locating perforations with a pitch slightly greater than the width of the reference exposure and has a leading and/or trailing non-perforated portion preceding or following the exposure locating perforations;

determining, using a pair of perforation sensors spaced apart a distance which is the same as the pitch of the series of exposure locating perforations, that one of the sensors has detected one of the exposure locating perforations and the other has not to identify the leading or trailing non-perforated portion of the filmstrip; and making the reference exposure on the leading or trailing portion of the filmstrip when one of the sensors has detected one of the exposure locating perforations and the other has not, whereby the reference exposure can be located in conformity with respective exposures made on the filmstrip substantially between successive pairs of the exposure locating perforations.

3. A method of making a reference exposure on a filmstrip, comprising the steps of:

selecting a filmstrip that has an exposure locating perforation for each scene exposure made on the filmstrip to enable a series of successive exposures to be evenly located along the filmstrip, and has a leading and/or trailing portion without any of these perforations;

determining, using respective perforation sensors relatively arranged to simultaneously detect individual exposure locating perforations for two successive scene exposures, that at least one of the sensors has detected one of the exposure locating perforations and another has not to identify the leading or trailing portion of the filmstrip; and making the reference exposure on the leading or trailing portion of the filmstrip when at least one of the sensors has detected one of the exposure locating perforations and another has not.

4. A method of making a reference exposure on a filmstrip, comprising the steps of:

selecting a filmstrip that has a series of symmetrically arranged exposure locating perforations for successive scene exposure made on the filmstrip and has a leading and/or trailing portion without any of these perforations;

determining, using a plurality of perforation sensors relatively arranged to simultaneously detect at least two of the exposure locating perforations, that at least one of the sensors has detected one of the exposure locating perforations and another has not to identify the leading or trailing portion of the filmstrip; and making the reference exposure on the leading or trailing portion of the filmstrip when the sensors have detected one of the exposure locating perforations and another has not.

* * * * *